(12) United States Patent
Raper et al.

(10) Patent No.: US 10,415,728 B2
(45) Date of Patent: Sep. 17, 2019

(54) SEAL FOR A PIPE COUPLING (71) Applicant: Pegler Yorkshire Group Limited, West Yorkshire (GB)

(72) Inventors: Nigel Paul Raper, West Yorkshire (GB); Karl Andrew Evans, West Yorkshire (GB)

( * ) Notice: Subject to any disclaimer, the term of this patent is extended or adjusted under 35 U.S.C. 154(b) by 1149 days.

(21) Appl. No.: 14/721,230

(22) Filed: May 26, 2015

(65) Prior Publication Data

US 2015/0260324 A1    Sep. 17, 2015

Related U.S. Application Data (62) Division of application No. 12/530,285, filed as application No. PCT/GB2008/000790 on Mar. 7, 2008.

(30) Foreign Application Priority Data

Mar. 7, 2007 (GB) .................................. 0704339.1

(51) Int. Cl.
*F16L 21/035* (2006.01)
*F16L 37/092* (2006.01)

(52) U.S. Cl.
CPC ......... *F16L 21/035* (2013.01); *F16L 37/0925* (2013.01)

(58) Field of Classification Search
CPC ............................. F16L 21/022; F16L 21/035
USPC .................. 285/370; 277/609, 616, 626, 644
See application file for complete search history.

(56) References Cited

U.S. PATENT DOCUMENTS

| 3,259,406 | A | * | 7/1966 | Kish | F16L 19/065 |
| | | | | | 174/84 S |
| 3,544,119 | A | | 1/1970 | Glover | |
| RE27,342 | E | * | 4/1972 | Valenziano | F16L 21/035 |
| | | | | | 277/625 |
| RE27,736 | E | * | 8/1973 | Muhlner et al. | B29C 57/025 |
| | | | | | 264/249 |
| 5,599,028 | A | | 2/1997 | Neumann | |
| 5,626,349 | A | | 5/1997 | Sutherland | |
| 6,264,206 | B1 | * | 7/2001 | Hashizawa | F16J 15/061 |
| | | | | | 277/641 |
| 6,334,619 | B1 | * | 1/2002 | Dietle | F16J 15/322 |
| | | | | | 277/551 |

FOREIGN PATENT DOCUMENTS

| CA | 2461537 A1 | * | 4/2003 | ............ F16L 21/035 |
| CA | 2449329 A1 | * | 5/2004 | ............ F16L 21/035 |
| DE | 3145181 A1 | | 6/1982 | |

(Continued)

*Primary Examiner* — James M Hewitt, II (57) ABSTRACT

A pipe coupling device includes a body adapted for insertion into a pipe, the body having a through passage, and on its outer surface a groove for receiving a seal for forming a fluid-tight seal between the pipe and the body, the seal having a retaining portion and a sealing portion, wherein either the groove, the seal or both are constructed and arranged such that the retaining portion holds the seal within the groove when the sealing portion is subjected to the insertion force experienced when the pipe coupling device is inserted into a pipe. Further, the base portion may be axially wider than the sealing portion. Further, the seal may include reinforcing means adapted to prevent the seal leaving the groove.

20 Claims, 6 Drawing Sheets

(56) References Cited

FOREIGN PATENT DOCUMENTS

| DE | 3236965 A1 | 4/1984 | |
|---|---|---|---|
| DE | 19717185 A1 | 10/1998 | |
| DE | 10161109 A1 * | 6/2002 | ............ F16J 15/002 |
| EP | 0793041 A1 * | 9/1997 | ............ F16J 15/022 |
| GB | 2331137 A | 5/1995 | |
| WO | 2004/104466 A1 | 2/2004 | |

* cited by examiner

SEAL FOR A PIPE COUPLING

CROSS REFERENCE TO RELATED APPLICATIONS

This application is a Divisional of U.S. patent application Ser. No. 12/530,285, filed Feb. 3, 2010, which is a National Phase filing of PCT/GB2008/000790, filed Mar. 7, 2008, which claimed the benefit of Great Britain Patent Application No. GB 0704339.1, filed Mar. 7, 2007, all of which are incorporated herein by reference.

TECHNICAL FIELD

This invention relates to a pipe coupling having a sealing means and, in particular, to a pipe coupling having a sealing means that engages with the inside surface of a pipe to form a seal between the coupling and the pipe.

BACKGROUND OF THE INVENTION

Pipe couplings that engage with the internal surface of a pipe are known. Such couplings typically comprise a body having a diameter that is slightly smaller than that of the inside diameter of a pipe to which they are adapted to couple with. The body includes gripping means and sealing means mounted to its external surface to engage with the internal surface of the pipe. The gripping means and sealing means are usually mounted in grooves formed in the body. The gripping means and sealing means project out of the grooves so they can effectively engage with the inside surface of a pipe. The gripping means and sealing means are typically adapted to project sufficiently out of the grooves to compensate for any slight deviations in the diameter of the pipe due to manufacturing tolerances, for example. Thus, when the pipe coupling is inserted into a pipe end, the sealing means is compressed as it engages with the end of the pipe and is forced into the pipe.

The most common type of sealing means used in these couplings are O-rings. O-rings are particularly effective at sealing between the coupling and the pipe. If the pipe end is not prepared appropriately it can be difficult for the sealing means to be reliably received within the pipe. This problem is exacerbated the more the seal projects from the groove to compensate for tolerances. Insufficiently prepared pipes may have burrs caused by cutting of the pipe or may not have been chamfered. Further, if the pipe has been deformed when it was cut, or squashed, or the coupling is inserted into the pipe at an angle to the pipe's axis, the sealing means can be drawn out of its groove making the seal ineffective. Thus, as the pipe coupling is inserted into the pipe, the sealing means will engage with the pipe end, which may cause the sealing means, or more commonly a part of the sealing means, to leave its groove and compromise the seal.

SUMMARY OF THE INVENTION

According to a first aspect of the invention we provide a pipe coupling device comprising a body adapted for insertion into a pipe to be coupled to the device, the body having a through passage, and on its outer surface a groove for receiving a sealing means for forming a fluid-tight seal between an internal surface of the pipe and the body, the sealing means having a retaining portion and a sealing portion, wherein either the groove, the sealing means or both are constructed and arranged such that the retaining portion holds the sealing means within the groove when the sealing portion is subjected to the insertion force experienced when the pipe coupling device is inserted into a pipe.

This is advantageous as the sealing means is constructed and arranged in the groove such that the retaining portion can hold the sealing means in the groove even when the pipe coupling is inserted into the pipe at an angle. The retaining portion of the sealing means is captured by a pipe that is inserted over the coupling device prior to it engaging with the sealing portion, which prevents the sealing means being drawn from the groove. The retaining portion of the sealing means engages with the groove or the inside surface of the pipe and acts to hold the sealing means in the groove.

Preferably the sealing means has an asymmetric cross-section. Preferably, the retaining portion comprises a part of the sealing means that, in use, lies wholly within the groove. Thus, when the pipe coupling device is inserted into a pipe, the retaining portion will be received within the pipe without resistance and can then act against the groove or pipe to retain the sealing means within the groove.

The retaining portion may comprise at least 25% of the axial width of the sealing means. Preferably, the retaining portion comprises between 25% and 75% of the axial width of the sealing means.

Preferably, the pipe coupling device includes a reinforcing ring that is mounted in the groove radially outwardly of the retaining portion to assist in retaining the sealing means in the groove.

The groove may include a ledge portion that engages with the retaining portion to assist in retaining the sealing means in the groove.

Preferably, the sealing means comprises a base portion, which abuts the groove, that is wider than the sealing portion. The wider base portion resists the torsional force exerted on the sealing means when the pipe contacts and slides over the sealing portion, which projects out of the groove.

Preferably the sealing means is annular. Preferably, the sealing means is of plastics material or a rubber material.

Preferably the sealing means has a V-shaped cross-section. Alternatively it may have a right-angled triangular cross-section or a T-shaped cross-section or rectangular cross-section having a semicircular outwardly facing side. Further, the sealing means may have a ridged outwardly facing surface.

According to a second aspect of the present invention we provide a pipe coupling device comprising a body adapted for insertion into a pipe to be coupled to the device, the body having a through passage, and on its outer surface a groove for receiving a sealing means for forming a fluid-tight seal between an internal surface of the pipe and the body, the sealing means comprises a base portion that abuts the body and a sealing portion that is adapted to abut the pipe, wherein the base portion is axially wider than the sealing portion.

When the pipe coupling device is inserted into a tube, the sealing portion, which projects from the groove, is contacted by the pipe which places a shear or torsional force on the sealing means. However, the wider base portion advantageously prevents the sealing means from being urged out of the groove.

Preferably, the base portion comprises two annular, axially spaced ridges. Alternatively, the base portion may have a substantially rectangular cross-section.

The base portion may be secured to the groove by an adhesive layer. The layer may secure the sealing means to a base of the groove, a side wall of the groove or a combination.

According to a third aspect of the present invention we provide a pipe coupling device comprising a body adapted for insertion into a pipe to be coupled to the device, the body having a through passage, and on its outer surface a groove for receiving a sealing means for forming a fluid-tight seal between an internal surface of the pipe and the body, wherein the sealing means includes reinforcing means adapted to prevent the sealing means leaving the groove when the sealing means is subjected to the insertion force experienced when the pipe coupling device is inserted into a pipe.

The reinforcing means is such that it is flexible enough to allow the sealing means to be assembled onto the body of the coupling, but provides sufficient rigidity to hold the sealing means in the groove when the coupling device is inserted into a pipe. The use of a reinforcing means is advantageous as the sealing means can be made of a material that is sufficiently soft to form a seal and the reinforcing means gives the sealing means the required rigidity to be reliably retained in the groove.

Preferably, the reinforcing means comprises a split ring embedded in the sealing means. The sealing means may be formed by moulding it around reinforcing means. Preferably the reinforcing ring is of plastics, although it may be of metal.

Preferably the reinforcing ring is contained wholly within the sealing means. Alternatively, the reinforcing means may comprise a reinforcing band that projects out of the sealing means.

BRIEF DESCRIPTION OF THE DRAWINGS

There now follows by way of example only a detailed description of the present invention with reference to the accompanying drawings in which.

DETAILED DESCRIPTION OF ILLUSTRATIVE EMBODIMENTS

Figure 1:
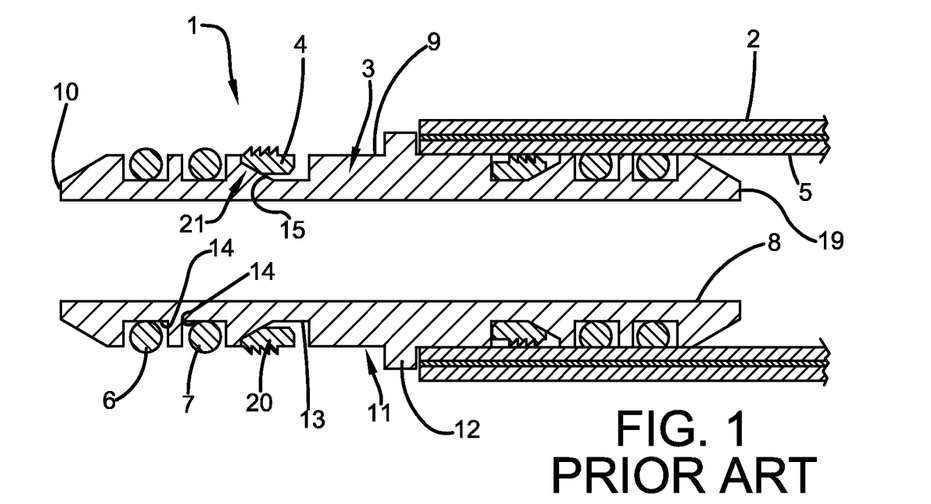
FIG. 1 shows a known pipe coupling.

The coupling device 1 of FIG. 1 is for coupling two plastics pipes 2, for example for use in domestic water systems, in a fluid-tight manner. Only one pipe 2 is shown, on the right-hand side of the Figure, the left-hand side being shown before a pipe is attached.

The device 1 comprises a metal body 3 carrying a gripping means in the form of a grip ring 4 for engagement with an internal surface 5 of the pipe 2 to retain the pipe on the body 3, and two seals 6,7 for sealing in a fluid-tight manner between the internal surface 5 of the pipe 2 and the body 3. The grip ring 4 is an externally toothed split member of relatively flexible plastics with four teeth 20 on its external surface. The body 3 has a straight through-bore 8, and a profiled external surface 9. Only one end of the body 3 will be described, as the other end is a mirror-image.

The free end 10 of the body 3 is frusto-conical in shape, for ease of insertion into the pipe 2, while the central portion 11 has a projection 12 forming a stop for the end of the pipe 2. Adjacent the projection 12 the body 3 has an external grip ring groove 13 in which the grip ring 4 is received. Two further external grooves 14 are formed adjacent the free end 10 for receiving the first sealing means 6 and the second sealing means 7, both comprising O-ring seals.

To assemble the pipe coupling 1 the grip ring 4 is first put onto the body 3 into the groove 13, and then the O-rings 6,7 are pushed on from the free end, into their grooves 14, as shown in the left-hand side of FIG. 1. It will be appreciated that the O-rings project radially out of the grooves 14, and that the teeth 20 of the grip ring 4 also project radially out of the groove 13. The amount the grip ring 4 and the O-rings project out of the groove 14 affects the insertion force required to operate the coupling. Therefore, it will be appreciated that the grip ring 4 and O-rings project sufficiently to engage with a pipe but do not project to a degree to hinder assembly of the coupling 1 and pipe 2.

In use, in order to attach a pipe 2 to the pipe coupling 1 the user inserts the free end 10 of the body 3 into the free end of the pipe 2, and then pushes the two together. The body 3 will be inserted until the end of the pipes 2 engages the projection 12. As the body is inserted the O-rings 6,7 are compressed against their grooves 14 and the internal surface 5 of the pipe thereby forming a seal therebetween. The teeth 20 of the grip ring 4 engage with the pipe 2 to secure it in engagement with the coupling 1. If the user attempts to separate the pipe 2 and coupling 1, an inclined portion 21 of the grip ring 4 will engage with a ramped portion 15 of the groove 14 thereby increasing the diameter of the grip ring 4. This causes the teeth 20 to engage more securely with the pipe 2 thereby holding the pipe 2 and coupling 1 together.

Figure 2:
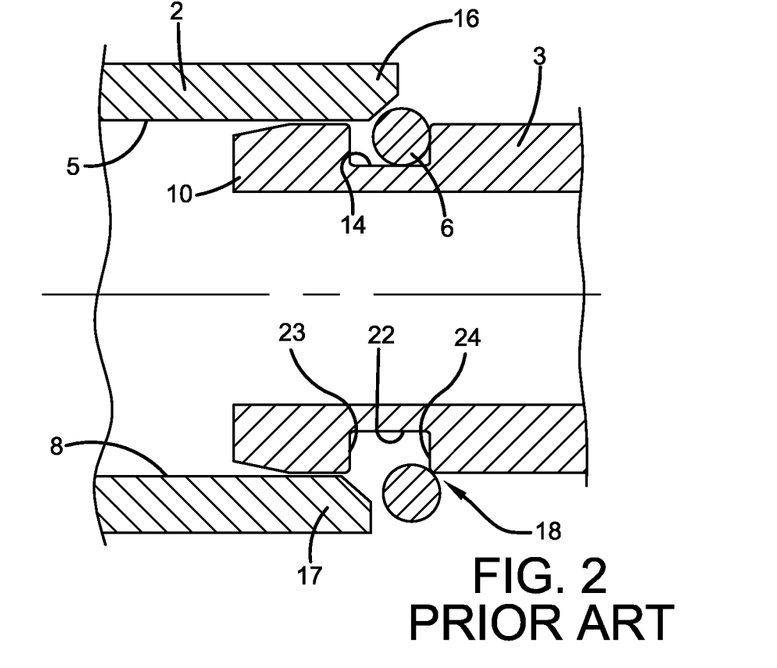
FIG. 2 shows a terminal portion of the pipe coupling of FIG. 1 part-inserted into a pipe.

FIG. 2 shows an enlarged view of the free end 10 wherein only one groove 14 and one sealing means 6 is shown for simplicity. The groove 14 comprises a base 22, a first side wall 23 and a second side wall 24. The pipe 2 has been inserted over the free end 10 at an angle to the axis of the coupling 1, such that a first portion 16 of the pipe 2 contacts the sealing means 6 prior to the diametrically opposite second portion 17. As can be seen from FIG. 2, the O-ring seal 6 has been forced against the second side wall 24 and out of the groove 14 at position 18. As can be appreciated, with the O-ring seal in this position, the seal between the body 3 and the pipe 2 will not be reliable. Also, further insertion of the coupling 1 into the pipe 2 could cause damage to the O-ring, particularly if the pipe 2 was metal.

FIGS. 3 to 13 show embodiments of the sealing means 30, 40, 50, 60, 90, 100, 110, 120, 130 of the invention.

Figure 3:
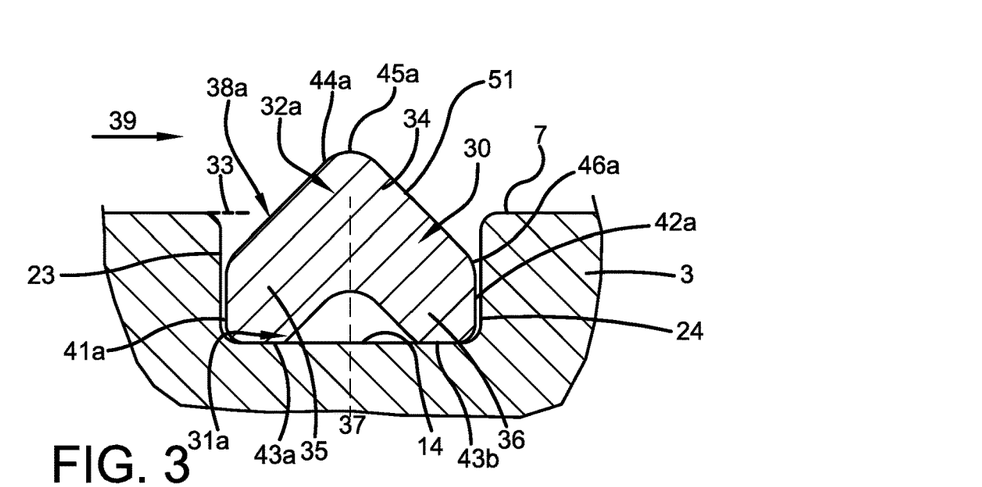
FIG. 3 shows a first embodiment of the sealing means mounted in a groove of a pipe coupling in accordance with the first and second aspects of the invention.

FIG. 3 shows a first embodiment of the sealing means 30 of the invention mounted in a groove 14 of body 3. The sealing means 30 comprises a base portion 31a, that abuts the body 3 at the base of the groove 14, and a sealing portion 32a, that engages with the pipe 2 and forms a seal. The sealing portion 32a substantially comprises the part of the sealing means 30 that projects out of the groove above a level 33 defined by the body 3. It will be appreciated that when the coupling device 1 is inserted into a pipe 2, the sealing means 30 will deform and therefore there may be parts of the sealing means in addition to the sealing portion 32a that form a seal with the pipe 2. Further, there may be parts of the sealing means 30 in addition to the base portion 31a that form a seal 15 with the body 3. This may occur in all of the embodiments discussed herein.

The sealing means 30 is annular and comprises a circumferential head part 34 and two circumferential leg parts 35, 36. The leg parts 35 and 36 extend radially inwardly from the head part 34, but are also each inclined at an angle either side of the radially inwardly direction (represented by dashed line 37). Thus, the sealing means 30 has a substantially V-shaped cross-section. The head part 34 forms the sealing portion 32a and the two leg parts 35 and 36 form the base portion 31a, which abuts the base 22 of the groove. Therefore, the base portion 31a comprises two annular, axially spaced ridges. Thus, a wide base portion 31a is formed by the diverging leg parts 35, 36 to stabilise the sealing means 30 in the groove 14. This prevents the sealing means 30 being urged out of the groove when it is subjected to the insertion force of the pipe coupling device 1 being inserted into a pipe 2. This is further aided by a retaining portion 38a. In this embodiment the coupling device 1 is adapted such that the pipe 2 is inserted over the coupling in the direction of arrow 39. Thus, the pipe 2 will pass over the retaining portion 38a and then contact the sealing portion 32a. As the retaining portion 38a makes up a substantial part of the sealing means 30, it acts against the inside surface of the pipe 2 to prevent the sealing means 30 being twisted, rolled or urged out of the groove 14.

Figure 14:
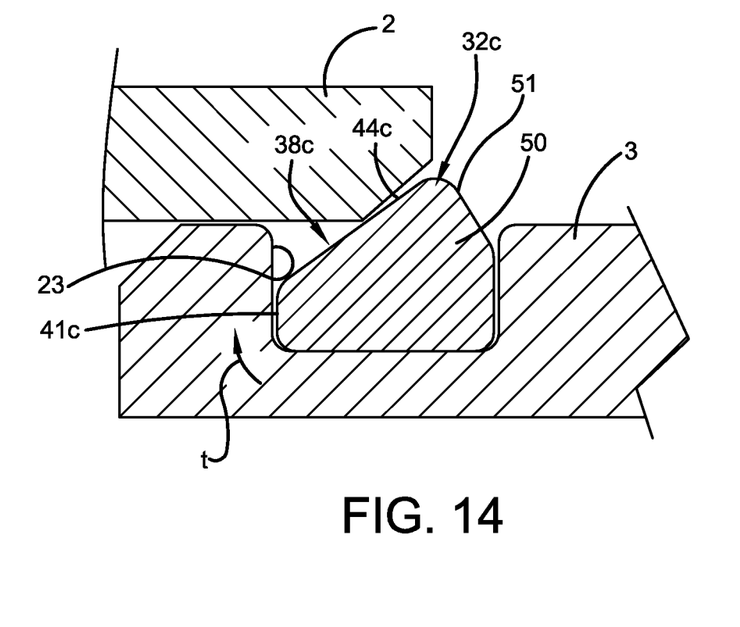
FIG. 14 shows the sealing means of the third embodiment during insertion of the pipe.

The retaining portion 38a comprises a first flat surface 41a that is parallel to the first side wall 23 of the groove 14. The first flat surface 41a engages with the first side wall 23 of the groove 14 to hold the sealing means 30 within the groove 14 when the sealing portion 32a is subjected to torsional forces experienced when the pipe coupling device 1 is inserted into the pipe 2. This is shown in FIG. 14 with respect to the sealing means 50 of the third embodiment (discussed in more detail below) during insertion of the device 1 into a pipe 3. This occurs in all of the embodiments discussed herein.

For example, FIG. 14 shows the sealing means 50 of the third embodiment (FIG. 5, discussed in more detail below) during insertion of the device 1 into a pipe 3. FIG. 14 shows the sealing means 50 after the initial engagement of the pipe 2 and the sealing means 50, when the pip has been deformed when it was cut, or squashed, or the coupling is inserted into the pipe at an angle to the axis of the pipe. FIG. 14 shows the torsional force t acting on the sealing means 50, particularly at the location of the first flat surface 41c and the adjacent first side wall 23 of the groove 14. The torsional force t acts clockwise due to the insertion force of the pipe 2 acting on the sealing portion 32c. It will be appreciated that the first flat surface 41c, which is parallel to the first side wall 23 of the groove 14, engages with the first side wall 23 of the groove 14 under the torsional force t and holds the sealing means 50 within the groove 14 when the sealing portion 32c is subjected to an insertion force experienced when the pipe coupling device is inserted into the pipe.

The sealing means 30 of the first embodiment (FIG. 3) also includes a second flat surface 42a parallel to the second side wall 24 of the groove 14.

The first annular ridge (or leg part) 35 is defined, at least in part, by the first flat surface 41a parallel to the first side wall 23 of the groove 14. The second annular ridge (or leg part) 36 is defined, at least in part, by the second surface 42a parallel to the second side wall 24 of the groove 14. The first flat surface 41a is adjacent the first sidewall 23 of the groove 14, and the second flat surface 42a is adjacent the second sidewall 24 of the groove 14. The annular ridges 35, 36 each have a flat surface 43a, 43b, parallel and adjacent to the base 22 of the groove 14.

The sealing portion 32a has a sealing surface 44a and a rear surface 51. The sealing surface 44a is the first surface of the sealing means 30 contacted by the pipe 2 on insertion of the device 1. The sealing surface 44a is formed of a flat surface oriented obliquely with respect to the first side wall 23 of the groove 14 and the second side wall 24 of the groove 14. The sealing surface 44a extends past the sealing portion 32a, into the groove 14. The rear surface 51 extends from a first end 45a within the sealing portion 32a, to a second end 46a outside the sealing portion 32a, within the groove 14 and adjacent the second side wall 24 of the groove 14.

Figure 4:
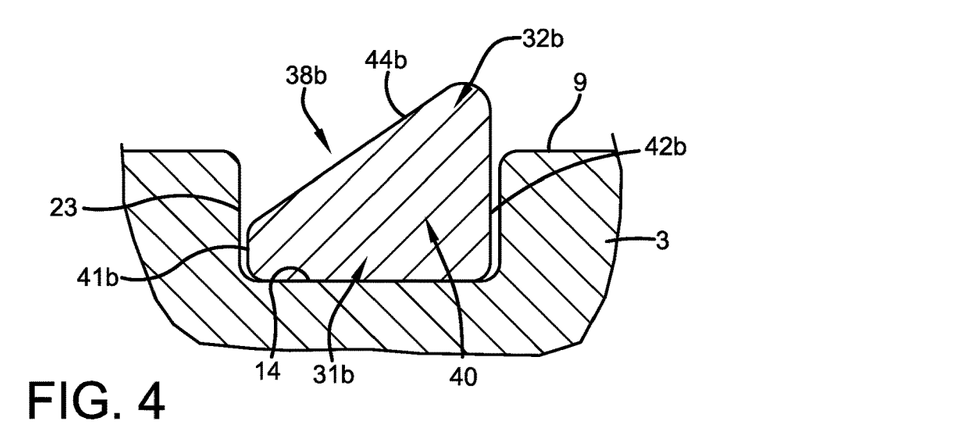
FIG. 4 shows a second embodiment of the sealing means in accordance with the first and second aspects of the invention.

A second embodiment of the sealing means is shown in FIG. 4 and is designated 40. The sealing means 40 is annular and has a cross-section 10 that is substantially right-angled triangular in shape, wherein the annular corners are rounded. The sealing means 40 includes a base portion 31b that abuts the base of the groove 14 and a sealing portion 32b to contact and seal against a pipe 2. Due to the shape of the sealing means 40, the retaining portion 38b is larger than the retaining portion 38a of the first embodiment. Therefore, a substantial amount of the sealing means 40 will be held beneath the pipe 2 when the pipe contacts the sealing portion 32b. This, in combination with the wide base portion 31b, prevents the sealing means 40 being forced out of the groove 14 on insertion of a pipe 2 over the coupling 1.

As discussed in relation to the first embodiment, the sealing means 40 also includes a first flat surface 41b parallel to the first side wall 23 of the groove 14, and a second flat surface 42b parallel to the second side wall 24 of the groove 14. The first flat surface 41b holds the sealing means 40 within the groove, as discussed above.

The sealing portion 32b of the sealing means 40 of the second embodiment (FIG. 4) has a sealing surface 44b. The sealing surface 44b is the first surface of the sealing means 40 contacted by the pipe 2 on insertion of the device 1. The sealing surface 44b is formed of a flat surface oriented obliquely with respect to the first side wall 23 of the groove 14 and the second side wall 24 of the groove 14. The sealing surface 44b extends past the sealing portion 32b, into the groove 14.

Figure 5:
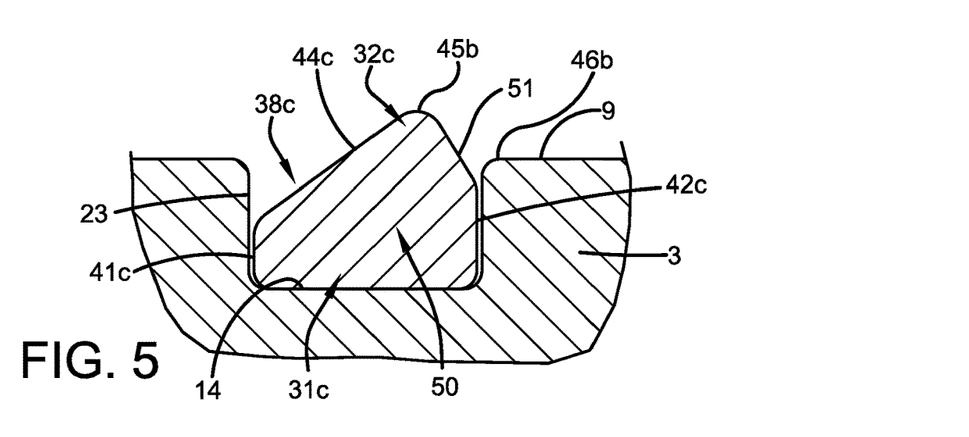
FIG. 5 shows a third embodiment of the sealing means in accordance with the first and second aspects of the invention.

The third embodiment shown in FIG. 5 is a modification of the second embodiment. The sealing means 50 has a substantially right-angled triangular profile but one of the corners is replaced with an inclined section 51. Accordingly, the sealing portion 32c has a sealing surface 44c and a rear surface 51. The sealing surface 44c is the first surface of the sealing means 50 contacted by the pipe 2 on insertion of the device 1. The sealing surface 44c is formed of a flat surface oriented obliquely with respect to the first side wall 23 of the groove 14 and the second side wall of the groove 24. The sealing surface 44c extends past the sealing portion 32c, into the groove 14. The rear surface 51 extends from a first end 46b within the sealing portion 32c, to a second end 45b outside the sealing portion 32c, within the groove 14 and adjacent the second side wall 24 of the groove 14.

The inclined section 51 is advantageous as it spaces the sealing portion 32c from the external surface 9 adjacent the groove 14. If the sealing means 40 of FIG. 4 is required to be particularly flexible, then the sealing portion 32c may be deformed by the pipe 2 such that it is pinched between the pipe 2 and surface 9, which may damage it. The presence of the inclined surface 51 reduces the chance that the sealing portion 32c could be damaged.

As discussed in relation to the first embodiment, the sealing means 50 also includes a first flat surface 41c parallel to the first side wall 23 of the groove 14, and a second flat surface 42c parallel to the second side wall 24 of the groove 14. The first flat surface 41c holds the sealing means 50 within the groove, as discussed above.

Figure 6:
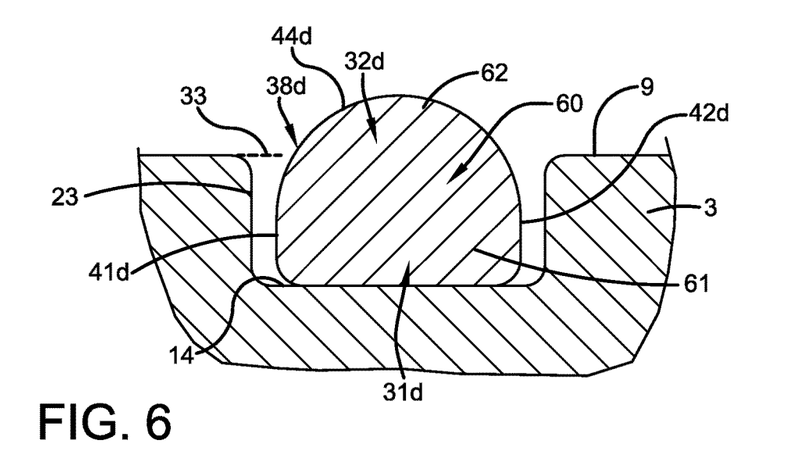
FIG. 6 shows a fourth embodiment of the sealing means in accordance with the first and second aspects of the invention.

FIG. 6 shows a fourth embodiment in which the sealing means 60 comprises an annular seal having a cross-section comprising a rectangular part 61 and a semi-circular part 62. The semicircular part 62 extends from the outwardly facing side of the rectangular part 61. The semicircular part 62 projects from the groove 14 above level 33 and forms the sealing portion 32d. The rectangular part 61 abuts the base of the groove 14 and forms the base portion 31d.

The sealing portion 32d of the sealing means 60 of the fourth embodiment has a sealing surface 44d. The sealing surface 44d is the first surface of the sealing means 60 contacted by the pipe 2 on insertion of the device 1. The sealing surface 44d extends past the sealing portion 32d, into the groove 14.

As discussed in relation to the first embodiment, the sealing means 60 also includes a first flat surface 41d parallel to the first side wall 23 of the groove 14, and a second flat surface 42d parallel to the second side wall 24 of the groove 14. The first flat surface 41d holds the sealing means 60 within the groove, as discussed above.

Figure 7:
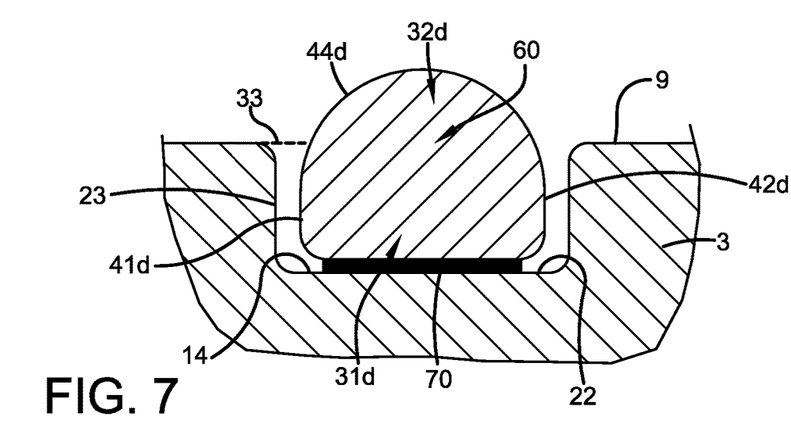
FIG. 7 shows the fourth embodiment of the sealing means including an adhesive base layer.
Figure 8:
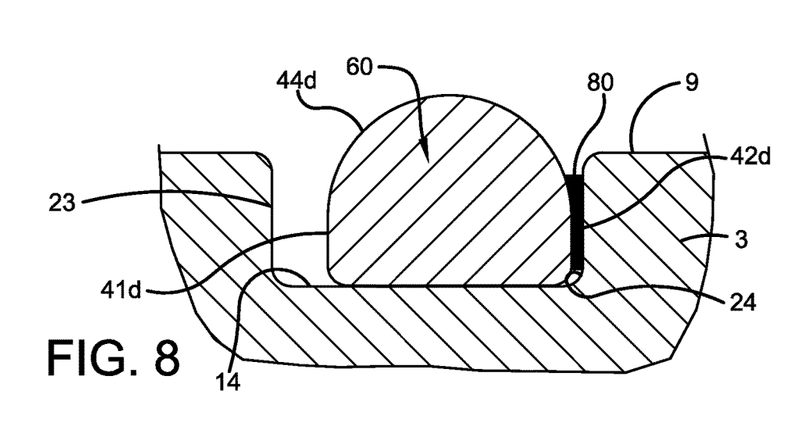
FIG. 8 shows the fourth embodiment of the sealing means including an adhesive side layer.

The sealing means 60 of FIG. 7 is identical to that of FIG. 6 and therefore the same reference numeral has been used. However, the sealing means 60 has been further secured in the groove by an adhesive 70. The adhesive 70 has been applied to the inwardly facing surface of the sealing means 60 and thus secures the base portion 31d to the base 22 of the groove. Similarly, the sealing means 60 of FIG. 8 employs an adhesive layer 80 that secures the sealing means 60 to the second side wall 24. The adhesive layers 70 and 80 both work in addition to the wide base portion 31d and retaining portion 38d to hold the sealing means in the groove 14.

Figure 9:
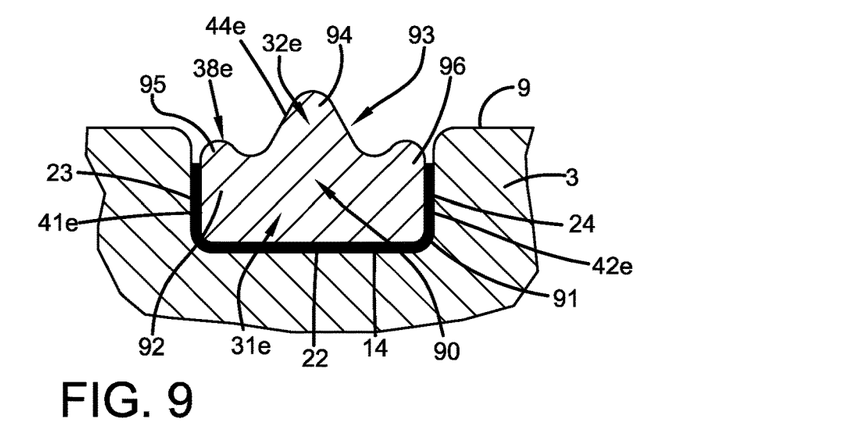
FIG. 9 shows a fifth embodiment of the sealing means secured in the groove by adhesive in accordance with the first and second aspects of the invention.

FIG. 9 shows a fifth embodiment (FIG. 9) of the sealing means designated 90. The sealing means 90 is annular and has a cross-section comprising a rectangular part 92 and a ridged part 93. The ridged part 93 extends from the outwardly facing side of the rectangular part 92. The ridged part 93 comprises two axially spaced small ridges 95 and 96 separated by a large central ridge 94 that forms the sealing portion 32e. The sealing portion 32e has a sealing surface 44e. The sealing surface 44e is the first surface of the sealing means 40 contacted by the pipe 2 on insertion of the device 1. The sealing surface 44e extends past the sealing portion 32e, into the groove 14.

For a pipe 2 that is inserted over the coupling from left to right as shown in the Figure, the ridge 95 will form the retaining portion 38e. The sealing means 90 is also secured to the base 22 of the groove 14 and its side walls 23 and 24 by an adhesive layer 91. It will be appreciated that the adhesive layer 91 may not be necessary depending on the application and the forces expected to be applied to the coupling 1.

As discussed in relation to the first embodiment, the sealing means 90 also includes a first flat surface 41e parallel to the first side wall 23 of the groove 14, and a second flat surface 42e parallel to the second side wall 24 of the groove 14. The first flat surface 41e holds the sealing means 90 within the groove, as discussed above.

Figure 10:
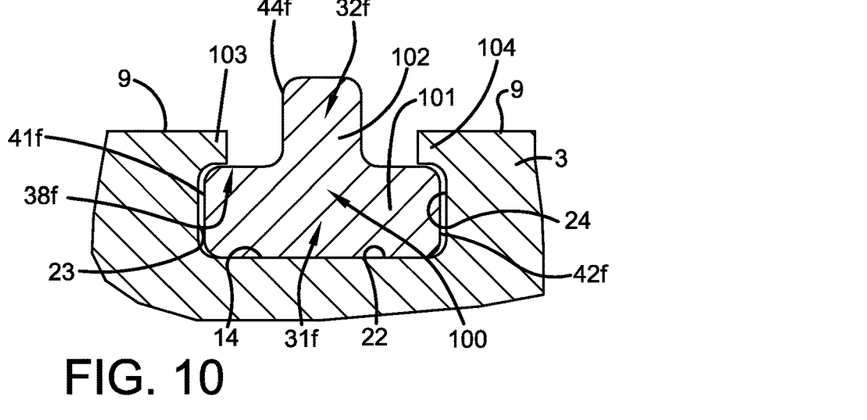
FIG. 10 shows a sixth embodiment of the sealing means mounted in a modified groove in accordance with the first and second aspects of the invention.

FIG. 10 shows a sixth embodiment of the sealing means 100 and a modification to the groove 14. The sealing means 100 is annular as in previous embodiments and comprises a ring portion 101 of rectangular cross-section, that forms the base portion 31f, and an annular flange 102 that extends from the outwardly facing surface of the ring portion 101 and forms the sealing portion 32f.

The groove 14 comprises a base 22 and first and second side walls 23 and 24 respectively, as before. However, it also comprises a first annular ledge 103 extending from the first side wall 23 adjacent the surface 9 and a second annular ledge 104 extending from the second side wall 24 adjacent the surface 9. In this embodiment, the retaining portion 38f is received under the first ledge 103 and will therefore be retained in the groove 14 when the sealing portion 32f is subjected to the insertion forces of the coupling 1 into the pipe 2. In addition, as discussed in relation to the first embodiment, the sealing means 100 also includes a first flat surface 41f parallel to the first side wall 23 of the groove 14, and a second flat surface 42f parallel to the second side wall 24 of the groove 14. The first flat surface 41f holds the sealing means 100 within the groove, as discussed above.

The sealing portion 32f of the sealing means 100 of the sixth embodiment has a sealing surface 44f. The sealing surface 44f is the first surface of the sealing means 100 contacted by the pipe 2 on insertion of the device 1. The sealing surface 44f extends past the sealing portion 32f, into the groove 14.

Figure 11:
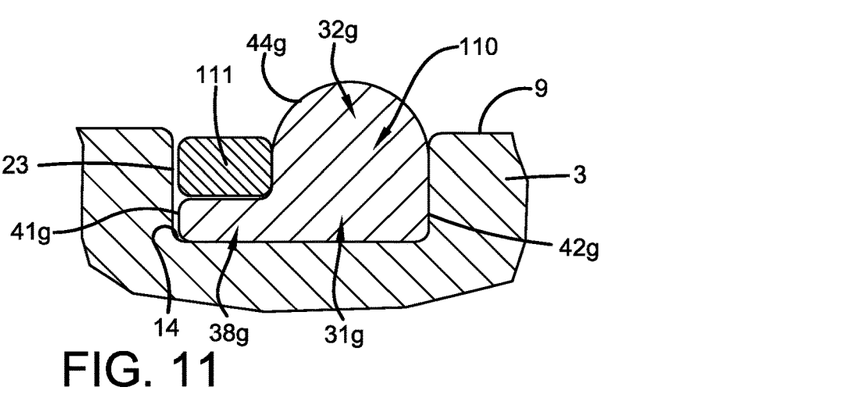
FIG. 11 shows a seventh embodiment of the sealing means in combination with a securing ring in accordance with the first, second and third aspects of the invention.

The seventh embodiment shown in FIG. 11 comprises a sealing means 110 similar in shape to the fourth embodiment, but includes an axially extending portion that forms the retaining portion 38g. Thus, in this embodiment, the retaining portion 38g also forms part of the base portion 31g. In addition to the sealing means 110, a reinforcing means 111 comprising a securing ring is mounted within the groove 14. The securing ring comprises a split ring of plastics material that lies adjacent to and radially outwardly of the retaining portion 38g. The retaining portion 38g is adapted to bear against the securing ring 111 thereby holding the sealing means 110 in the groove 14. In addition, as discussed in relation to the first embodiment, the sealing means 110 also includes a first flat surface 41g parallel to the first side wall 23 of the groove 14, and a second flat surface 42g parallel to the second side wall 24 of the groove 14. The first flat surface 41g holds the sealing means 110 within the groove, as discussed above.

The sealing portion 32g of the sealing means 110 of the seventh embodiment has a sealing surface 44g. The sealing surface 44g is the first surface of the sealing means 40 contacted by the pipe 2 on insertion of the device 1. The sealing surface 44g extends past the sealing portion 32g, into the groove 14.

Figures 12A, 12B:
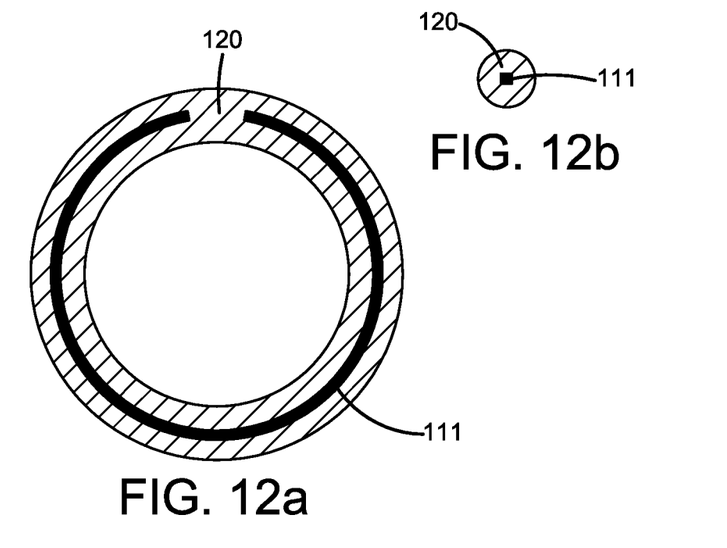
FIGS. 12a and 12b show a eighth embodiment of the sealing means in accordance with the third aspect of the invention having a reinforcing ring through the centre thereof.

FIGS. 12a and 12b show a sectional plan view and a cross-sectional view of an eighth embodiment. The sealing means 120 comprises an O-ring of circular cross-section having a reinforcing means 111 therein. The sealing means 120 may be moulded around the reinforcing means, which comprises a split ring of moulded plastics. The split ring 111 enables the sealing means to be made of a sufficiently deformable material to form a reliable seal between the pipe 2 and the body 3, while having sufficient rigidity due to the ring 111 to be held in the groove 14. Thus, the reinforcing means 111 should be of sufficient strength to prevent the sealing means escaping from the groove under the pipe 2 insertion force, while being flexible enough to allow the sealing means 120 to be mounted on over the body 3 and into the groove 14.

Figures 13A, 13B:
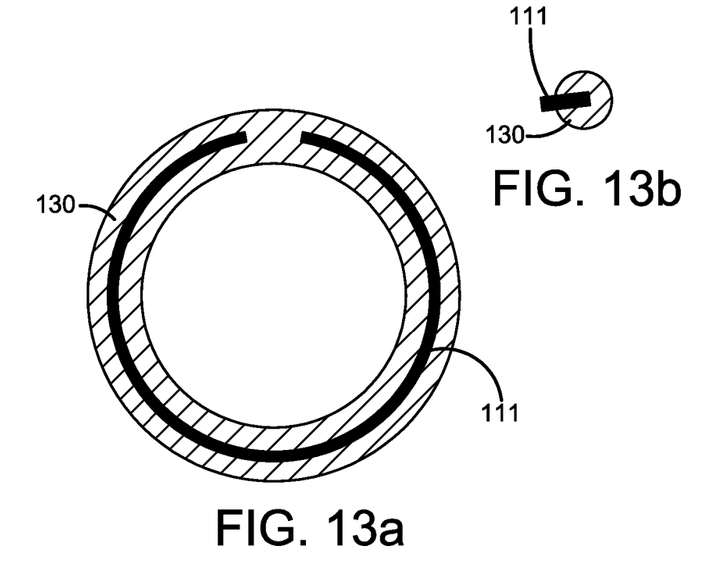
FIGS. 13a and 13b show a ninth embodiment of the sealing means having a reinforcing strip partially therein in accordance with the third aspect of the invention.

FIGS. 13a and 13b are similar views to those shown in FIGS. 12a and 12b and show a sealing means 130 including a reinforcing means 111. In this embodiment, the reinforcing means 111 comprises a split annular moulded plastics band. The band 111 acts in the same way as the wire ring of the eighth embodiment. It will be appreciated that the ring 111 of FIGS. 12a and 12b and the band 111 of FIGS. 13a and 13b may alternatively be of metal.

The invention claimed is:

1. A pipe coupling device comprising:
a cylindrical body having:
a first end for insertion into a pipe;
a through passage; and
a circumferential groove in the outer surface of the body, the groove having a base, a first side wall and a second side wall, the first side wall being adjacent the first end of the body, wherein the pipe coupling device is constructed and arranged such that the groove is received within the pipe when the pipe coupling device is fully inserted into the pipe; and
a seal for forming a fluid-tight seal between an internal surface of the pipe and the body, the seal received in the groove and comprising:
a sealing portion defined as the portion of the seal that projects out of the groove; and
a retaining portion defined by the axial width of the seal that lies under the pipe when the pipe initially contacts the seal during insertion of the pipe coupling device, wherein the retaining portion comprises at least 25% of the width of the seal measured from the first side wall of the groove to the second side wall of the groove; and
a flat surface parallel to the first side wall of the groove, wherein the flat surface parallel to the first side wall of the groove engages with the first side wall of the groove to hold the seal within the groove when the sealing portion is subjected to an insertion force experienced when the pipe coupling device is inserted into the pipe.

2. The pipe coupling device of claim 1, wherein the seal comprises a base portion that abuts the body of the pipe coupling device, the base portion comprising a first annular ridge, and a second annular ridge, spaced apart from the first annular ridge along the direction from the first side wall of the groove to the second side wall of the groove.

3. The pipe coupling device of claim 2, wherein the seal further comprises:
a second flat surface, parallel to the second side wall of the groove, wherein the first annular ridge is defined, at least in part, by the flat surface parallel to the first side wall of the groove; and wherein the second annular ridge is defined, at least in part, by the second surface parallel to the second side wall of the groove.

4. The pipe coupling device of claim 3, wherein the flat surface is adjacent the first sidewall of the groove, and the second flat surface is adjacent the second sidewall of the groove.

5. The pipe coupling device of claim 4, wherein either the first annular ridge, or second annular ridge, or both comprise a flat surface, parallel and adjacent to the base of the groove.

6. The pipe coupling device of claim 5, wherein the sealing portion comprises a triangular cross section in the direction from the first sidewall of the groove to the second sidewall of the groove.

7. The pipe coupling device of claim 6, wherein the sealing portion of the seal comprises a sealing surface and a rear surface, the sealing surface and the rear surface oriented obliquely with respect to the first and second side walls of the groove.

8. The pipe coupling device of claim 1, wherein the sealing portion of the seal comprises a sealing surface, the sealing surface being the first surface of the seal contacted by the pipe on insertion of the device and being formed of a flat surface oriented obliquely with respect to the first side wall of the groove and the second side wall of the groove, the sealing surface extending past the sealing portion, into the groove.

9. The pipe coupling device of claim 1, wherein the sealing portion of the seal comprises a rear surface oriented obliquely with respect to the second side wall of the groove, the rear surface being outside of the pipe when the pipe first contacts the seal.

10. The pipe coupling device of claim 9, wherein the rear surface extends from a first end within the sealing portion, to a second end outside the sealing portion, within the groove and adjacent the second side wall of the groove.

11. The pipe coupling device of claim 1, wherein the retaining portion comprises less than 75% of the width of the seal measured from the first side wall of the groove to the second side wall of the groove.

12. The pipe coupling device of claim 1, wherein the sealing portion of the seal comprises an asymmetrical triangular cross section in the direction from the first sidewall of the groove to the second sidewall of the groove.

13. The pipe coupling device of claim 1, comprising reinforcing means constructed and arranged to prevent the sealing means leaving the groove when the sealing means is subjected to the insertion force experienced when the pipe coupling device is inserted into a pipe.

14. The pipe coupling device of claim 13, wherein the reinforcing means comprises a ledge formed in the first and second side walls of the groove.

15. The pipe coupling device of claim 13, wherein the reinforcing means comprises a reinforcing ring embedded in the seal.

16. The pipe coupling device of claim 13, wherein the reinforcing means comprises a securing ring mounted within the groove, wherein the retaining portion of the seal is provided between the base of the groove and the securing ring.

17. The pipe coupling device of claim 1, wherein the groove and the seal are a first groove and a first seal, for forming a fluid tight join with a first pipe at the first end of the device, the cylindrical body further comprising:
a second end for insertion into a second pipe;

a second circumferential groove in the outer surface of the body; and a second seal for forming a fluid-tight join between an internal surface of a second pipe and the body, wherein the pipe coupling device is constructed and arranged such that when the device is inserted into the first pipe and the second pipe:

the first groove is received within the first pipe and outside the second pipe and the second groove is received within the second pipe and not the first pipe; and the pipe coupling device forms a fluid-tight passage from the first pipe to the second pipe.

18. An assembly comprising:

a pipe; and a pipe coupling device as claimed in claim 1, the pipe coupling device being inserted in the pipe such that the groove and seal are within the pipe.

19. A pipe coupling device comprising:

a cylindrical body having:
   a first end for insertion into a pipe,
   a through passage, and
   a circumferential groove in the outer surface of the body, wherein the pipe coupling device is arranged such that the groove is received within the pipe when the pipe coupling device is fully inserted into the pipe; and a seal for forming a fluid-tight seal between an internal surface of the pipe and the body, the seal received in the groove and comprising:

a base portion that abuts the body of the pipe coupling device, the base portion comprising two annular ridges, spaced apart along a direction from the first side wall of the groove to the second side wall of the groove; and a retaining portion defined by the axial width of the seal that lies under the pipe when the pipe initially contacts the seal during insertion of the pipe coupling device, the retaining portion comprising a flat surface parallel to a first side wall of the groove.

20. The pipe coupling device of claim 19, wherein the flat surface parallel to the first side wall of the groove engages with the first side wall of the groove to hold the seal within the groove when the sealing portion is subjected to an insertion force experienced when the pipe coupling device is inserted into the pipe.

\* \* \* \* \*